United States Patent

[11] 3,576,102

[72] Inventor Floyd G. West
 Park Forest South, Ill.
[21] Appl. No. 823,040
[22] Filed May 8, 1969
[45] Patented Apr. 27, 1971
[73] Assignee Allis-Chalmers Manufacturing Company
 Milwaukee, Wis.

[54] TURBOCHARGER SYSTEM
 7 Claims, 5 Drawing Figs.
[52] U.S. Cl.......................................... 60/13,
 123/119
[51] Int. Cl. ....................................... F02b 37/00
[50] Field of Search.......................... 60/13;
 123/119 (C), 119 (C1), 119 (C2), 119 (C4)

[56] References Cited
 UNITED STATES PATENTS
1,816,787 7/1931 Moss ............................. 123/119

| | | | |
|---|---|---|---|
| 2,005,821 | 6/1935 | Buchi ............................ | 60/13 |
| 2,306,277 | 12/1942 | Oswald .......................... | 123/119 |
| 2,369,175 | 2/1945 | Prince ........................... | 60/13 |
| 2,380,777 | 7/1945 | Moss ............................ | 60/13 |
| 2,387,560 | 10/1945 | Boulet ........................... | 60/13 |
| 2,412,970 | 12/1946 | Crary ............................ | 60/13 |

FOREIGN PATENTS 354,242 7/1931 Great Britain................ 60/13

Primary Examiner—Douglas Hart
Attorneys—Arthur L. Nelson, Charles L. Schwab and Robert B. Benson ABSTRACT: A turbocharger system having two stage turbocharging with an exhaust gas bypass to partially bypass the first stage turbocharger when the engine is operating at high load high speed conditions.

PATENTED APR 27 1971    3,576,102

Inventor
Floyd G. West
By
Attorney

TURBOCHARGER SYSTEM

This invention relates to a turbocharger system and more particularly to a two stage turbocharger system with an exhaust gas bypass valve and a high pressure stage turbocharger favoring low speed operating conditions and a low pressure turbocharger favoring high speed engine conditions.

The use of a turbocharger in connection with internal combustion engines is well known. The turbocharger serves as a means for recovering a portion of the energy in exhaust gases and utilizing this energy to supercharge the combustion chamber of the engine. The turbocharger includes a turbine driven at high speed with engine exhaust gases wherein the turbine is connected directly to a compressor to precompress the air which is subsequently delivered to the intake system of the internal combustion engine. The varying conditions of engine load and engine speed prevent the turbocharger from maintaining a constant ratio of turbocharging to the engines. Turbocharged engines which operate at varying atmospheric pressure conditions often used a waste gate which will divert the exhaust gases to atmosphere when the atmospheric pressure is high and have a means for closing the waste gate when the atmospheric conditions are low to thereby connect the turbocharger for turbocharging the engine.

Under many circumstances a single stage turbocharger is adequate for turbocharging the engine. The single stage consists essentially of an exhaust driven turbine directly connected by a shaft to a compressor which receives air at atmospheric pressure and precompresses the air as it is supplied to the intake manifold in the engine. For optimum conditions it is desirable to maintain substantially the same exhaust gas velocity through the turbine nozzle to maintain the turbocharger speed for high load conditions with high or low engine speed. A reduced power requirement at low speed can in part be accommodated by effectively reducing the nozzle area to maintain exhaust gas velocity in the system. For a single stage turbocharger system, this can be also accomplished by having a plurality of turbochargers in parallel and placing a desired number of turbochargers on the line in response to the engine speed and load requirements.

Where a two stage turbocharger system is used, this system would not accomplish the desired supercharging of the engine and accordingly, a two stage system with no bypass arrangement to accommodate for the increased volume of exhaust gas when the engine is running at high speed full load as compared to low speed for full load conditions would reduce the efficiency of the engine. The high pressure turbine will unduly restrict the flow of exhaust gas from the exhaust manifold and this in turn will build up the exhaust gas pressure and decrease engine efficiency. Accordingly, it is proposed to provide a bypass valve in parallel with a high pressure stage turbine of an internal combustion engine. The bypass exhaust valve will bypass the high pressure turbine with the inlet to the bypass valve and the high pressure turbine both connected to the exhaust manifold. The discharge end of the high pressure turbine and the downstream side of the exhaust bypass valve are both connected to a conduit forming the inlet passage to the low pressure stage turbine. The bypassing of exhaust gas is controlled by the bypass valve in response to pressure conditions of the engine. These pressure conditions can be sensed in the intake manifold, the exhaust manifold or the exhaust pipe intermediate the high- and low-pressure stage turbochargers.

Accordingly, the bypass valve will remain closed during low speed operation of the engine and during high speed operation the bypass valve will open to shunt a portion of exhaust gas directly to the low pressure stage turbine and thereby increase precompression of air to the high pressure compressor.

It is an object of this invention to provide in an internal combustion engine a two stage turbocharger system having an exhaust bypass valve regulating the bypass flow of exhaust gas around the high-pressure turbine for controlling turbocharging of the engine.

It is another object of this invention to provide in an internal combustion engine having a two stage turbocharger system and matching the high-pressure turbocharger to the engine so it favors lower engine speed range.

It is another object of this invention to provide in an internal combustion engine a means of matching the high-pressure turbocharger so it favors the low engine speed range and the low-pressure turbocharger so it favors high engine speed range to provide the required amount of air for turbocharging the engine.

It is a further object of this invention to provide a two stage turbocharger system for an internal combustion engine to relieve undue restriction of exhaust gas by the high pressure turbine during high-speed high-load engine operation and to supply an adequate quantity of precompressed air to supercharge the engine.

It is a further object of this invention to provide in a supercharged internal combustion engine, a high-pressure and low-pressure turbocharger with a pressure responsive exhaust bypass valve shunting the high pressure turbine to adequately supercharge the engine under all speed and load conditions.

The objects of this invention are accomplished by providing a two stage turbocharger system for an internal combustion engine in which the exhaust manifold supplies exhaust gas to the high-pressure turbine at all times during engine operations. A bypass valve is positioned to shunt exhaust gas around the high pressure stage during high engine load and speeds to prevent undue restriction of exhaust gas flow during high engine speed operation. The low-pressure turbine is connected to the bypass valve and the high-pressure turbine and receives a portion of exhaust gas directly from the manifold and favors high engine speed to precompress a greater amount of air to supply to the high-pressure compressor to increase the air supply to the intake manifold during high speed engine conditions. An intercooler and an aftercooler are also used to increase the air density for supercharging the combustion chamber for providing greater engine output.

The preferred embodiments of this invention are illustrated in the attached drawings.

Figure 1:
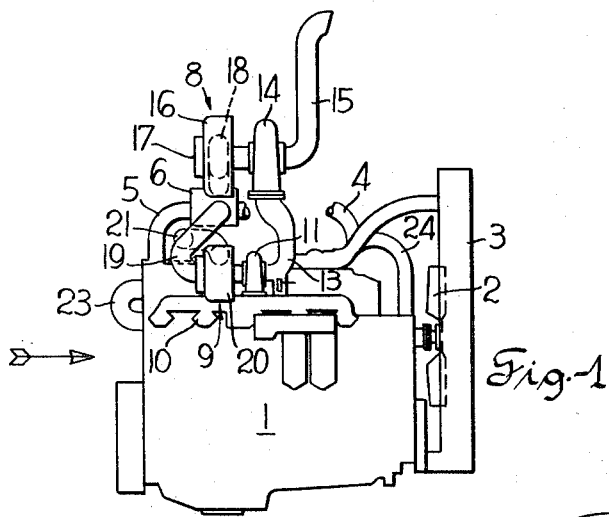
FIG. 1 is a side elevation view of an internal combustion engine and a two stage turbocharger system.
Figure 2:
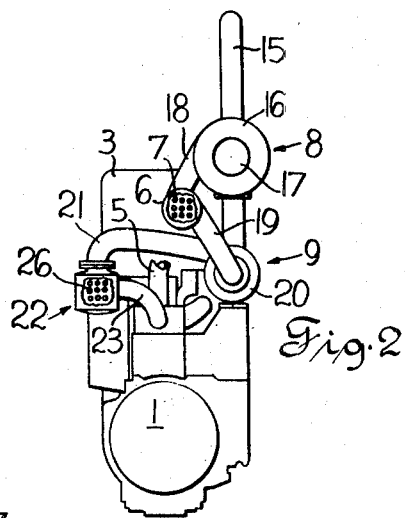
FIG. 2 is a rear end view of the internal combustion engine with the two stage turbocharger system viewed as indicated by the arrow in FIG. 1.

Referring to FIG. 1, an internal combustion engine 1 is illustrated. The engine is liquid colled with an engine driven fan.

The liquid cooling system includes a radiator 3 and a forced liquid cooling system having a water pump. The fluid cooling system is also connected by conduit 4 and 5 to the intercooler 6. The intercooler 6 includes liquid passages 7 as well as air passages which flow over the exterior of liquid passages to cool the precompressed air from the low-pressure compressor 18 as it passes through the intercooler 6 to the high-pressure compressor 20. The high-pressure turbocharger 9 includes a turbine 11 connected to the exhaust manifold 10 on the engine 1. The exhaust manifold 10 discharges exhaust gases into a high-pressure turbine 11 which drives the high-pressure compressor 20. The high-pressure turbine 11 is connected by the exhaust pipe 13 which in turn is connected to the low-pressure turbine 14 of the low-pressure turbocharger 8. Exhaust gas from the low-pressure turbine 14 is then discharged through the tailpipe 15 to atmosphere. The low-pressure turbocharger also includes a low-pressure compressor 16 having an air inlet 17 for receiving air from the atmosphere. The low-pressure compressor precompresses air and discharges the air to the intake conduit 18 which in turn is connected to the intercooler 6. The intercooler 6 cools the precompressed air, delivers the air to the air conduit 19 which in turn is connected to the high-pressure compressor 20 of the high-pressure stage 9. The high-pressure compressor further compresses the intake air and delivers the compressed air to the intake air conduit 21 which transfers the air to the intake manifold 22 which also operates as an aftercooler. The intake manifold 22 includes liquid conduits 26 which extend longitudinally through the intake manifold and is provided with liquid conduits 23 and 24 to the engine cooler system.

Figure 3:
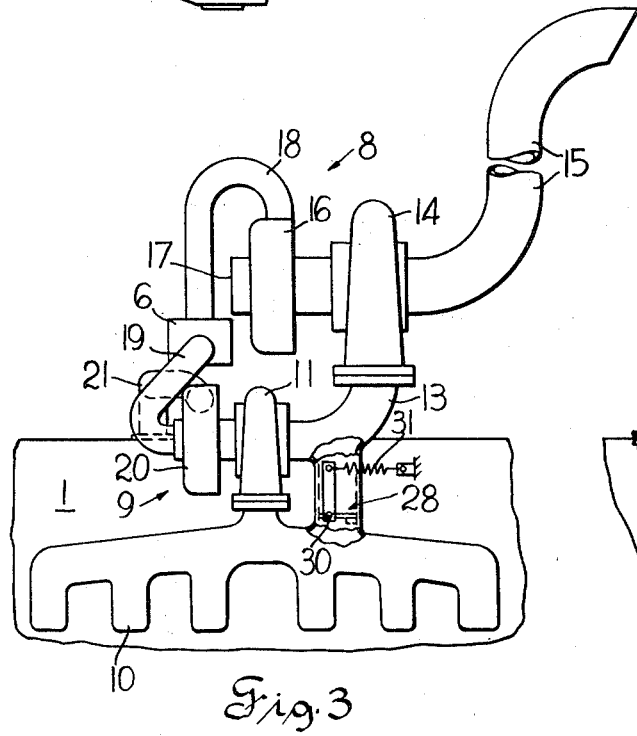
FIG. 3 illustrates a bypass valve operating in response to differential pressures in the exhaust manifold and the exhaust passage between the turbines of the two stages.

Referring to FIG. 3, the internal combustion engine 1 is shown with an enlarged view of the two stage turbocharger system, and the bypass exhaust valve. The high-pressure stage turbine 11 drives the high-pressure stage compressor 14.

The high-pressure turbine 11 is connected between the manifold 10 and the exhaust pipe 13 which supplies exhaust gas to low-pressure turbine 14. The low-pressure turbine 14 exhausts the gas into the tailpipe 15. The low-pressure turbine 14 drives the low-pressure compressor 16. The low-pressure compressor 16 precompresses the air and supplies the air to the intercooler 6 through the air conduit 18. The air is further compressed by the high-pressure stage compressor 20 and delivers the air to the intake manifold 22. During normal full speed operation bypass valve 28 is usually closed and all the exhaust gas passes through a high-pressure stage turbine 11. The high-pressure stage turbine 11 is designed to operate to supply an adequate mass of air to the intake manifold at low-speed high-load engine characteristics. When the load is maintained on the engine and the speed is increased then the high-pressure turbine 11 unduly restricts the flow of exhaust gas through the turbine thereby causing an increase in the differential pressure between the exhaust manifold and the exhaust pipe 13. This, in turn, will cause the butterfly valve 28 to pivot on its pivotal axis defined by the pin 30 against the biasing force of the spring 31. This will open the valve 28 permitting the bypassing of a portion of exhaust gases around the high-pressure stage turbine 11 and flow directly to the low pressure turbine 14 in the low-pressure turbocharger 8. Exhaust gases are then discharged through the exhaust pipe 15. The low pressure stage turbine 14 is designed to operate more efficiently when a greater volume of exhaust gas flows through the turbine 14. This, in turn, will precompress a greater volume of intake air in the low-pressure stage compressor 16 and supply a greater mass of air to the high-pressure stage compressor 20 and the intake manifold 22. As the mass of air supplied by the intake manifold is increased, the greater mass combined with increased fuel quantity increases power output of the engine.

Figure 4:
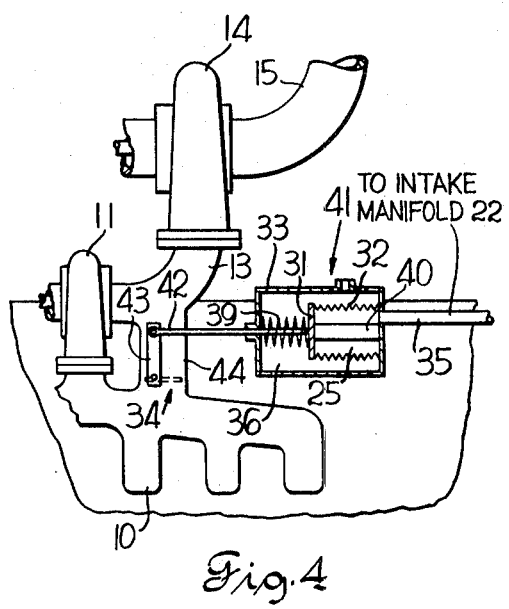
FIG. 4 illustrates a modification of the exhaust valve operating in response to a differential pressure of the intake manifold relative to atmospheric pressure.

Referring to FIG. 4 a modification of the exhaust bypass valve is shown. A piston 31 connected to a bellows 32 in the actuator housing 33 provides a pressure responsive means for operating valve 34. The chamber 25 defined by the piston 31 and bellows 32 is connected by the intake conduit 35 to the intake manifold 22. The external chamber 36 around the diaphragm 32 within the housing 33 is in communication with the atmosphere. This, in turn, creates a differential pressure across the piston 31. The piston 31 is biased by the spring 39 against the stop 40 in the valve actuator 41. An actuating arm 42 is connected to the lever 43 of the exhaust valve 34. Exhaust valve 34 is positioned in a passage 44 intermediate a manifold 10 in the exhaust pipe 13. While the differential pressure in the exhaust pipe 13 and manifold 10 partially affects the valve movement, the atmospheric pressure relative to the intake manifold 22 is the controlling pressure for operating the actuator 41.

Figure 5:
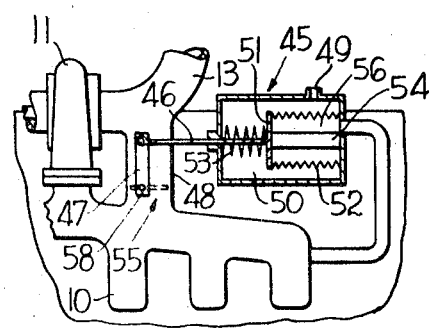
FIG. 5 illustrates a modification of the exhaust valve operating in response to a differential between the exhaust manifold and atmospheric pressure.

Referring to FIG. 5 another modification is illustrated in which the actuator 45 is connected by an actuator rod 46 to a lever 47 of the exhaust pipe 48. The vent 49 is connected to the atmosphere and chamber 50 is maintained at atmospheric pressure. The piston 52 is connected to the bellows 52. The piston 51 is biased by the spring 53 against the stop 54 during the normally closed position of the valve 55. When the pressure in the exhaust manifold 10 builds up the pressure in the chamber 56 also increases biasing the piston 51 to move off its seat 54 against the biasing force of spring 53. The lever 47 pivots on its axis defined by the pin 58 causing the butterfly valve 55 to open. The opening of the valve 55 permits exhaust gases to bypass around the high-pressure stage 9 and supply more energy to the low-pressure turbocharger which precompresses a greater volume of air to supercharge the engine.

The operation of the two stage supercharger will be described in the following paragraphs.

When the engine 1 is operating at a low-speed high-load condition, the high-pressure stage turbocharger unit effectively turbocharges the engine with the low-pressure stage in an idling condition. Referring to FIG. 3 the bypass of exhaust valve 28 is closed and the exhaust gases pass through the high-pressure stage turbine 11 and subsequently through a low-pressure turbine 14 of the low-pressure turbocharger 8. The turbines drive their respective compressors 20 and 16 and supercharge the intake manifold. The quantity of precompressed air supplied to the intake manifold is in response to the energy of the exhaust gas flowing through the turbines. The low volume of exhaust gas at low speed operation is not sufficient to bypass any appreciable amount of exhaust gas around the high-stage turbine 11. The air supply to the intake manifold, however, is adequate to carry the load requirements of the engine. When a high-load condition is accompanied with high speed of the engine 1, greater exhaust pressure is created in the exhaust manifold 10 and the high-pressure turbine 11 creates an undue restriction on the flow of exhaust gases from the manifold. The pressure in the exhaust pipe 13 does not increase adequately with an increase in pressure in the manifold 10 except for the fact that the differential pressure due to the increased pressure in exhaust manifold 10 will cause the bypass exhaust valve 28 to open. This, in turn, will bypass a quantity of exhaust gas around the high pressure stage turbine 11 in response to differential pressures between the exhaust manifold 10 and the exhaust pipe 13. The bypassing of exhaust gases will divert exhaust gases around the high-pressure turbine 11 and make available an increased amount of energy in the exhaust gases supplied to the low-pressure turbine 14 in the low-pressure turbocharger 8. This, in turn, will precompress a greater quantity of air from the atmosphere. The precompressed air, in turn, is then supplied to the compressor 20 of the high-pressure turbocharger 9 which further compresses the air as it is supplied to the intake manifold 22. Accordingly, it can be seen that with an increased load and increased speed, the air supplied to the engine is substantially greater which, in turn, provides more oxygen for combustion of a greater amount of fuel to compensate for the increased load on the engine. The intercooler 6 is positioned in the supercharger system to cool the air which is precompressed by the low-pressure compressor 16 and a further cooling is provided by the aftercooler in the intake manifold 22. The cooling of the air makes it possible to supply a greater weight of air to the combustion chamber which, in turn, will increase the power output of the engine as an increased quantity of fuel is also supplied to the combustion chambers. Accordingly, it is understood that FIGS. 4 and 5 also operate in response to a pressure condition in the supercharger system. The supercharger system consisting essentially of the exhaust manifold and the two stage supercharger for supplying precompressed air to the combustion chamber in response to the exhaust driven turbines. The quantity of air delivered to the combustion chamber is in response to the load requirements of the engine. In FIG. 4, intake manifold pressure is used to control the bypass valve. This is a satisfactory method of operating the bypass valve since intake manifold pressure is very closely related to the pressures supplied to the two turbines 11 and 14.

The embodiments of the invention in which an exclusive property or privilege is claimed are defined as follows:

I claim:

1. A two stage turbocharger system for use on the exhaust system of an internal combustion engine comprising: an exhaust manifold, a high-pressure stage turbocharger including a high-pressure turbine connected to and receiving exhaust gas from the exhaust manifold of an internal combustion engine, a low pressure stage turbocharger including a low-pressure turbine connected to the discharge side of the high-pressure turbine and receiving discharge exhaust gas, a bypass exhaust duct connected to said exhaust manifold and the discharge side of said high-pressure turbine for connection in parallel to said high-pressure turbine, a bypass exhaust valve in said duct for bypassing a portion of the exhaust gas around said high-pressure turbine to thereby increase the energy in the exhaust gas supplied to the low pressure turbine and provide greater supercharging of said engine.

2. A two stage turbocharger system as set forth in claim 1 wherein said high-pressure stage includes said high-pressure turbine driving a high-pressure compressor and said low-pressure stage includes a low-pressure turbine driving a low-pressure compressor.

3. A two stage turbocharger system as set forth in claim 1 wherein the bypass exhaust valve in said duct connected between the inlet and discharge ends of said high pressure turbine operates in response to the pressure differential across said high pressure turbine.

4. A two stage turbocharging system as set forth in claim 1 wherein said bypass exhaust valve includes a valve actuator having an element operating in response to the pressure differential between the exhaust manifold and atmospheric pressure to thereby control the opening and closing of said bypass valve.

5. A two stage turbocharger system as set forth in claim 2 including an intercooler connected intermediate the low and high-pressure compressors of the turbocharger stages.

6. A two stage turbocharger system as set forth in claim 1 wherein said exhaust valve includes a valve actuator having a power wall and housing defining a high- and low-pressure chamber whereby the power wall is subject to a differential in pressure to operate said exhaust bypass valve.

7. A two stage turbocharger system as set forth in claim 1 including said bypass exhaust valve, resilient means normally biased said valve to a closed position.